3,020,300
ALKYL-TRIS-DIALKYL PHENYLSILANES
Wilhelm J. Schnabel, Columbus, Ohio, assignor to Olin Mathieson Chemical Corporation, a corporation of Virginia
No Drawing. Filed June 5, 1959, Ser. No. 818,272
2 Claims. (Cl. 260—448.2)

This invention relates to novel monoalkyl-tris-alkylphenylsilanes which are useful as high temperature resistant fluids and lubricants. It also relates to a method for preparing these compounds.

The novel compounds of this invention have the general formula:

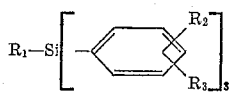

wherein $R_1$ and $R_2$ are alkyl radicals and $R_3$ is hydrogen or an alkyl radical. The useful alkyl radicals contain 2 to 5 carbon atoms and include, for example, ethyl, n-propyl, iso-propyl, butyl, and amyl.

It is known that aryl groups impart thermal stability to organo-silicon compounds, however, they also tend to increase the melting point. Tetraphenylsilane, for example, melts at 236° C. Monoalkyl-triphenylsilanes in which the single alkyl group is attached directly to the silicon atom also show rather high melting points, for instance, monoalkyl-triphenylsilanes having from 2 to 12 carbon atoms in the alkyl group exhibit melting points of from 67.5° to 88° C., thus excluding their use as fluids or lubricants. The monoalkyl-tris-alkylphenylsilanes of this invention are characterized by a wide liquid range and exhibit excellent thermal stability. These valuable properties make such compounds useful for many industrial applications such as high temperature resistant fluids, as lubricants and as heat transfer media.

The novel monoalkyl-tris-alkylphenylsilanes can be prepared by admixing a monoalkyltrichlorosilane, a haloalkylbenzene and an alkali metal, preferably sodium in the presence of an inert solvent such as ethyl ether, n-propyl ether, benzene, toluene or xylene according to the following equation:

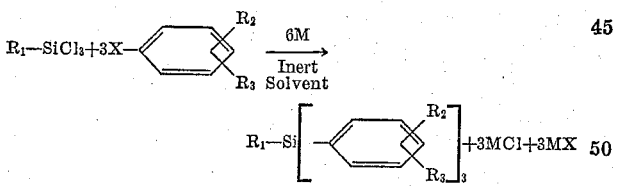

wherein $R_1$, $R_2$, and $R_3$ have the same meaning as previously defined, X is a halogen selected from the group consisting of chlorine, bromine or iodine and M is an alkali metal. Monoalkyltrichlorosilanes useful as starting materials include, for example, ethyltrichlorosilane, n-propyltrichlorosilane, and n-butyltrichlorosilane. Useful haloalkylbenzenes include, for example, p-bromoethylbenzene, o - bromoethylbenzene, p - bromo-n-propylbenzene, o-bromo-n-butylbenzene, bromo-diethylbenzene, bromo-di-n-propylbenzene and the corresponding chlorine and iodine derivatives. Although the reaction can be carried out at room temperature, elevated temperatures up to about 150° C. can also be employed if desired. The reaction time can be varied widely from about 2 to 150 hours or more with the preferred reaction time being from about 5 to 75 hours.

It has been found, surprisingly, that the introduction of short chain alkyl radicals containing from 2 to 5 carbon atoms is very effective in decreasing the melting point of aryl silanes, thus making it possible to synthesize liquid materials with a wide liquid range of prevailing aromatic character which is advantageous with regard to thermal and oxidation stability. The low aliphatic-bound hydrogen content of the novel compounds is much less than that of diphenyldidodecylsilane which has been reported in the literature to be a suitable lubricant and hydraulic fluid for high temperature applications.

Monoalkyl-tris-alkylphenylsilanes are stable at 700° F. (372° C.). They exhibit a comparatively wide liquid range with boiling points of from about 440°–460° C. and have pour points below 0° C. The thermal stability was tested by heating the products at 700° F. At the end of five hours the average weight loss was found to be approximately 1.4 percent. On prolonged heating at this temperature no trace of carbonization and only slight changes in color were observed.

The novel compounds of this invention and their preparation will be further illustrated by reference to the following examples.

EXAMPLE I

*Ethyl-tris-p-ethylphenylsilane*

Sodium ribbon cut into small pieces (27.6 grams, 1.2 gram atoms) was suspended in 300 milliliters of ethyl ether and a mixture of ethyltrichlorosilane (29.33 grams, 0.18 mole) and p-bromoethylbenzene (111.0 grams, 0.6 mole) dissolved in 150 milliliters of ethyl ether was added drop-wise with vigorous stirring. The exothermic reaction was initiated by a few drops of ethyl acetate and a small iodine crystal. Addition of the mixture was adjusted so that a gentle reflux was maintained. After three hours the addition was completed. External heating was provided and stirring at reflux temperature was continued for 48 hours at which time most of the sodium had reacted. Hydrolysis was accomplished by cooling the mixture in an ice bath and adding cold water dropwise. The ether layer was separated, dried over sodium sulfate and fractionally distilled. Next, the main fraction was redistilled through a Vigreux column. A total of 28.4 grams of ethyl-tris-p-ethylphenylsilane, a colorless liquid, boiling at 195°–200° C. (0.45 mm. Hg), $n_D^{25}$ 1.5805, was obtained. The yield was 38 percent of theoretical.

Calcd. for $C_{26}H_{32}Si$: C, 83.81; H, 8.66; Si, 7.53. Found: C, 83.92; H, 8.82; Si, 7.77.

Kinematic viscosity:

| 100° F. | 210° F. |
|---|---|
| 96.3 centistokes | 7.4 centistokes |
| ASTM slope | 0.87 |

The termal stability was tested by heating the compound for five hours at 700° F. A weight loss of 1.2 percent was found. Only a very slight change in color was observed after heating.

EXAMPLE II

*n-Propyl-tris-p-ethylphenylsilane*

Sodium ribbon cut into small pieces (27.6 grams, 1.2 gram atoms) was suspended in 300 milliliters of ethyl ether and a mixture of n-propyltrichlorosilane (32.0 grams, 0.18 mole) and p-bromoethylbenzene (111.0 grams, 0.6 mole) dissolved in 150 milliliters of ethyl ether was added dropwise with vigorous stirring. The reaction was completed in the same manner as described in Example I. A total of 27.6 grams of product was obtained (39.7 percent of the theoretical quantity), boiling at 188°–190° C. (0.15 mm. Hg), $n_D^{26}$: 1.5748.

Calcd. for $C_{27}H_{34}Si$: C, 83.88; H, 8.86; Si, 7.26. Found: C, 83.82; H, 9.02; Si, 7.08.

Kinematic viscosity:

| 100° F. | 210° F. |
|---|---|
| 143.23 centistokes | 8.99 centistokes |
| ASTM slope | 0.86 |

The product was heated for five hours at 700° F. to test its thermal stability. A weight loss of 1.3 percent was observed. The refractive index was unchanged and the compound showed only a very slight change in color after heating.

EXAMPLE III n-Butyl-tris-p-ethylphenylsilane

Sodium ribbon cut into small pieces (41.4 grams, 1.8 gram atoms) was suspended in 500 milliliters of ethyl ether and a mixture of n-butyl-trichlorosilane (51.7 grams, 0.27 mole) and p-bromoethylbenzene (166.5 grams, 0.9 mole) dissolved in 150 milliliters of ethyl ether was added dropwise with vigorous stirring. The exothermic reaction was initiated by a few drops of ethylacetate and a small iodine crystal. Addition of the mixture was adjusted so that a gentle reflux was maintained. After three hours the addition was completed. The reaction mixture was stirred at room temperature for 72 hours after the exothermic reaction has subsided at which time most of the sodium had reacted. Hydrolysis was accomplished by cooling the mixture in an ice bath and adding cold water dropwise. Then the ether layer was separated, dried over sodium sulfate and fractionally distilled. Seventy-four grams of a colorless liquid, boiling at 200°–220° C. (0.4 mm. Hg), $n_D^{24}$: 1.5692, was obtained. Redistillation over a Vigreux column gave 56.2 grams of n-butyl-tris-p-ethylphenylsilane (51.9 percent of the theoretical quantity), boiling at 204°–208° C. (0.3 mm. Hg), $n_D^{28}$: 1.5696.

Calcd. for $C_{28}H_{36}Si$: C, 83.94; H, 9.06; Si, 7.00. Found: C, 84.00; H, 9.20; Si, 7.28.

Kinematic viscosity:

| 100° F. | 210° F. |
|---|---|
| 169.82 centistokes | 10.68 centistokes |
| ASTM slope | 0.83 |

A sample of the product was heated for five hours at 700° F. to test the thermal stability. A weight loss of 1.0 percent was found. After heating the refractive index was unchanged and the compound showed only a very slight change in color.

EXAMPLE IV n-Butyl-tris-p-n-propylphenylsilane

Sodium ribbon cut into small pieces (27.6 grams, 1.2 gram atoms) was suspended in 300 milliliters of ethyl ether and a mixture of n-butyl-trichlorosilane (34.5 grams, 0.18 mole) and p-iodo-n-propylbenzene (147.6 grams, 0.6 mole) dissolved in 150 milliliters of ethyl ether was added dropwise with vigorous stirring. The reaction was completed in the same manner as described in Example III with the exception that the reaction mixture in this experiment was maintained at reflux temperature for 24 hours. A total of 21.5 grams (27 percent of the theoretical quantity) of n-butyl-tris-p-n-propylphenylsilane, boiling at 217°–222° C. (0.45 mm. Hg), $n_D^{20}$: 1.5582, was obtained.

Calcd. for $C_{31}H_{42}Si$: C, 84.09; H, 9.56; Si, 6.34. Found: C, 83.72, 83.58; H, 9.54, 9.28; Si, 7.01, 7.23.

Kinematic viscosity:

| 100° F. | 210° F. |
|---|---|
| 160.95 centistokes | 12.88 centistokes |
| ASTM slope | 0.73 |

To test the thermal stability, a sample of n-butyl-tris-p-n-propylsilane was heated for five hours at 700° F. A weight loss of 1.4 percent was found. The compound showed only a very slight change in color after heating and the refractive index was unchanged.

EXAMPLE V

Ethyl-tris-p-ethylphenylsilane

Metallic sodium (55.2 grams, 2.4 gram atoms) was vigorously stirred with 1000 milliliters of xylene at 125°–130° C. for half an hour. Under continued vigorous stirring the temperature was gradually lowered to 70° C. A mixture of ethyltrichlorosilane (65.4 grams, 0.4 mole) and p-bromoethylbenzene (1.26 moles) dissolved in 200 milliliters of xylene was added dropwise over a period of four hours. The exothermic reaction set in immediately. The addition was adjusted so that a temperature of 70°–80° C. was maintained. The temperature was raised to 130° C. and the mixture stirred for eight hours at this temperature. Hydrolysis was accomplished by cooling the mixture in an ice bath and adding cold water dropwise. Fractional distillation of the mixture after hydrolysis gave 121.0 grams (81 percent of the theoretical quantity) of ethyl-tris-p-ethylphenylsilane which was identified by boiling point and refractive index.

EXAMPLE VI

(A) Bromodiethylbenzene

Bromine (480 grams, 3.0 moles) was added gradually, under stirring, over a period of three hours to a mixture of meta- and para-diethylbenzene (402.6 grams, 3.0 moles). Iron powder (5.0 grams) and iodine (0.5 gram) were used as the bromination catalyst. The reaction was carried out in a darkened hood and the temperature was kept between 25° and 35° C. by means of external cooling. After the addition of the bromine the reaction mixture was stirred for twenty-four hours at room temperature. The mixture was then washed with water and dilute sodium hydroxide and then fractionally distilled. A total of 435 grams of bromo-diethylbenzene (68 percent of the theoretical quantity), boiling at 238°–243° C. (745 mm. Hg), $n_D^{27}$: 1.5381, was obtained.

Calcd. for $C_{10}H_{13}Br$: Br, 37.50. Found: Br, 37.27, 37.19.

(B) Ethyl-tris-diethylphenylsilane

Metallic sodium (27.6 grams, 1.2 gram atoms) was vigorously stirred with 600 milliliters of xylene at 125°–130° C. for half an hour. Under continued vigorous stirring the temperature was gradually lowered to 70° C. A mixture of ethyltrichlorosilane (29.4 grams, 0.18 mole) and bromodiethylbenzene (128 grams, 0.6 mole) dissolved in 100 milliliters of xylene was added dropwise. The exothermic reaction started immediately. The addition was adjusted so that a temperature of 70°–80° C. was maintained. The addition was completed after 2½ hours. The mixture was stirred for 20 hours at approximately 80° C. and for an additional 24 hours at 110°–115° C. Ethyl-tris-diethylphenylsilane was isolated from the reaction mixture by addition of 50 milliliters of ethanol, stirring for 30 minutes, subsequent addition of 750 milliliters of cold water, removal of the aqueous layer and distillation which gave 31.4 grams of a slightly yellow liquid, distilling at 210°–225° C. (0.6 mm. Hg), $n_D^{28}$: 1.5622. Redistillation gave 25.5 grams of ethyl-tris-diethylphenyl-silane (31.0 percent of the theoretical quantity), boiling at 206°–212° C. (0.3 mm. Hg), $n_D^{26}$: 1.5657.

Calcd. for $C_{32}H_{44}Si$: C, 84.15; H, 9.71; Si, 6.14.
Found: C, 84.23; H, 9.87; Si, 6.25.

Kinematic viscosity:

| 100° F. | 210° F. |
|---|---|
| 447.38 centistokes | 14.87 centistokes |
| ASTM slope | 0.88 |

The thermal stability was tested by heating a sample of 10.2209 grams for five hours at 700° F. A weight loss of 0.2018 gram or 1.97 percent was found.

What is claimed is:
1. Liquid monoalkyl-tris-alkylphenylsilanes of the general formula:

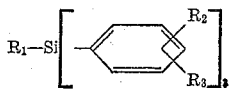

wherein $R_1$, $R_2$, and $R_3$ are alkyl radicals containing 2 to 5 carbon atoms.

2. Ethyl-tris-diethylphenylsilane.

References Cited in the file of this patent
UNITED STATES PATENTS
2,914,548    Schroll _____ Nov. 24, 1959

OTHER REFERENCES
Nametkin et al.: "Doklady Adak. Nauk. SSSR," volume 115 (1957), pages 107–109 (52 Chem. Abstracts 5323).

Topchiev et al.: ibid., volume 118 (1958), pages 731–734 (52 Chem. Abstracts 11, 769–70).

Benkeser et al.: "Journal American Chemical Society," volume 80 (1958), pages 2279–2282 (52 Chem. Abst. 15, 456–7).